Figure 1:
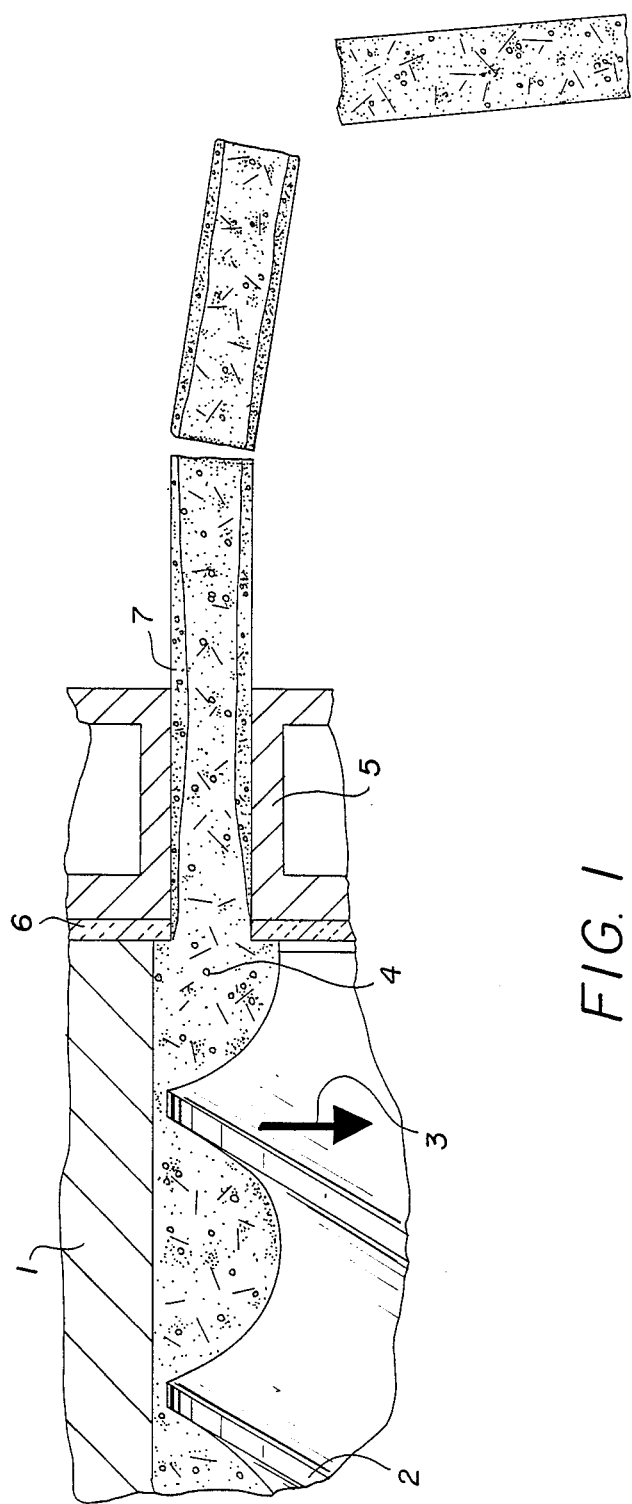

United States Patent [19]
Hupfer et al.

[11] Patent Number: 4,769,200
[45] Date of Patent: Sep. 6, 1988

[54] COMPOUNDING CRYSTALLINE ORGANIC MATERIALS

[75] Inventors: Leopold Hupfer, Friedelsheim; Juergen Paetsch, Wachenheim; Johann Hotz, Limburgerhof; Heino Thiele, Ludwigshafen; Hans D. Zettler, Gruenstadt, all of Fed. Rep. of Germany

[73] Assignee: BASF Aktiengesellschaft, Ludwigshafen, Fed. Rep. of Germany

[21] Appl. No.: 876,757

[22] Filed: Jun. 20, 1986

[30] Foreign Application Priority Data

Jun. 22, 1985 [DE] Fed. Rep. of Germany ....... 3522359

[51] Int. Cl.⁴ ............................................... B29B 9/06
[52] U.S. Cl. ..................... 264/143; 264/330; 425/308; 425/456; 544/135
[58] Field of Search .............. 264/142, 143, 330; 544/135; 425/308, 456

[56] References Cited

U.S. PATENT DOCUMENTS

| 3,544,525 | 12/1970 | Balint et al. | 264/143 X |
| 3,719,648 | 3/1973 | Frielink | 264/143 X |
| 3,952,080 | 4/1976 | Backlund et al. | 264/143 X |
| 4,264,543 | 4/1981 | Valenta | 264/117 X |
| 4,372,868 | 2/1983 | Saran et al. | 264/117 X |
| 4,374,082 | 2/1983 | Hochschild | 264/118 X |
| 4,418,030 | 11/1983 | Müller et al. | 264/142 |
| 4,435,603 | 3/1984 | Cornils et al. | 568/701 |
| 4,581,443 | 4/1986 | Garg | 264/142 X |
| 4,602,082 | 7/1986 | Akiyama et al. | 264/143 X |

Primary Examiner—Philip Anderson
Attorney, Agent, or Firm—Keil & Weinkauf

[57] ABSTRACT

In order to compound organic materials which are crystalline under standard conditions, these materials, in the pulverulent and/or molten state, are processed in a self-purging, twin-screw extruder in which the screws rotate in the same direction, ejected through one or more narrow passages into a low pressure zone, cooled and comminuted to give particles. In order to improve the pourability and shelf life, the materials are completely crystallized by the time they reach the end of the screws, and are heated during discharge through the narrow passage, in order to form a melt film. Dust-free granules havig a smooth surface can be produced in this manner.

3 Claims, 1 Drawing Sheet

COMPOUNDING CRYSTALLINE ORGANIC MATERIALS

The present invention relates to a process for compound crystalline organic materials.

To make it possible for them to be more easily introduced commercially and more easily processed, crystalline organic materials, for example polyols, have to be compounded. This is done in general by granulating them to produce flakes, pellets, etc. However, the transportation of these materials in large containers and their storage in silos give rise to problems in many cases. Even in the case of well crystallized polyols, agglomerates form after a short storage time, particularly at fairly high ambient temperatures. Storage tests with stacked sacks have shown that substantial compaction of the sack contents occurs after as little as three days under a load of 4 kN/sack and at an ambient temperature of 35° C., which corresponds roughly to the pressure exerted on the lowest layer of sacks under transportation conditions, with two-layer stacking of 1 tonne pallets. The contents are then no longer free-flowing when the sack is emptied.

To avoid the complications described, Japanese Pat. No. 74 88 813 (CA 83, 111 26 K (1975)) proposes the addition of esters of organic acids or of acetals as anticaking agents. According to the stated patent, the result of adding 0.005% by weight of butyl cellulose acetate was that neopentylglycol which had been subjected to a pressure of 230 P/cm$^2$ for 30 days after compounding did not show any caking. However, when higher pressures are reached, as occur during storage in the higher sack stacks which are usual today, the additives described substantially lose their effect. Moreover, they frequently give rise to problems during further processing.

Furthermore, German Pat. No. 3,010,138 discloses that the flowability of polyols which are crystalline under standard conditions can be improved if tertiary amines which contain two or more identical organic substituents, each of 2 to 20 carbon atoms, are added to the polyols in a concentration of from 0.005 to 0.25% by weight, based on the polyol, before the latter are purified by distillation or compounded.

The disadvantage of such additives, which from the point of view of occupational medicine too require careful handling, is that the polyols are employed in a large number of fields where amines are often undesirable or, for example in the case of esterifications, enter the waste water and cause ecological problems there. It is also known that most amines, particularly those possessing aromatic groups, easily give rise to color problems as a result of yellowing, as is found in the esterification test too. Such additives are particularly troublesome in the polyurethane sector because amines specially adapted to the system have to be employed there.

It is an object of the present invention to provide a process for compounding crystalline organic materials which avoids the disadvantages described and in particular permits the production of granules having a long shelf life.

We have found that this object is achieved by a process in which the material, in the pulverulent and/or molten state, is processed in a twin-screw extruder, discharged through one or more narrow passages (i.e. small channels of cylindrical shape, nozzles or extrusion dies) into a zone of lower pressure, cooled and comminuted to give particles, wherein the material has (partially or) completely crystallized by the time it reaches the end of the screws, and is heated during discharge through the said narrow passage(s), in order to form a melt film on the outer surface of the extruded material.

FIG. 1 depicts a sketch of the process.

FIG. 1 sketch of the process indicates the extruder housing 1 and co-rotating twin screw 2 which rotates in the direction shown whereby the material passes through heated passageway 5 forming the melt film 7. Insulation 6 and a crystallized material 4 are also indicated.

Examples of organic materials which are crystalline under the standard conditions are polyols, such as neopentylglycol, neopentylglycol hydroxypivalate, hexanediol and trimethylolpropane, anhydrides, such as phthalic anhydride, terephthalic anhydride and maleic anhydride, 4-methylbenzophenonecarboxylic acid, 4-chlorobenzophenonecarboxylic acid, lactams, such as caprolactam, phenols, such as diethylphenol or $\beta$-naphthol, and amines, such as phenyl-$\beta$-naphthylamine and 4,4'-diaminodiphenylmethane.

These materials, in a pulverulent and/or molten state, are introduced into a conventional, commercial extruder. Examples of particularly suitable extruders are self-purging, twin-screw extruders in which the screws rotate in the same direction and the housing is cooled in zones. The screws are advantageously provided with a heat transfer apparatus so that heat can also be taken up by the screws and removed, for example, along the screw shaft by coaxial flow. For this purpose, a pipe which is smooth on the inside and is provided on the outside with circulation channels is inserted in an axial screw hole. The circulation channel corresponds to a screw flight with a thread in the opposite direction. The enclosed cooling medium is inevitably conveyed to the screw tips and vaporized in the zones at high temperature. The vapor flows back along the central pipe to the zones at lower temperatures, and is condensed and again introduced into the circulation. Since both screws have to be at the same temperature, the corresponding feed lines and return lines are coupled.

In the extruder, the materials are processed, ie. pulverulent material is compacted and molten material is crystallized and compacted. During these procedures, the extruder is cooled. The temperature of the housing and of the screws is chosen in general so that the resulting mass temperatures are from about 1° to about 20° C. below the melting point of the material used. By the time it reaches the end of the screws, the material has completely crystallized and is then ejected through one or more narrow passages, preferably through a heated perforated plate possessing one or more holes of from 1 to 15 mm diameter, into a low pressure zone. During discharge through the perforated plate, the latter is heated to 1°-30° C. above the melting point of the material. For this purpose, the perforated plate can preferably be heated by means of steam or electrically. The uniform temperature profile of the perforated plate is important for this procedure, i.e. the temperature in the region of all the holes must be brought to the same value in order to ensure uniform discharge of the extrudates. In general, it has proven advantageous to discharge the materials through the holes at a specific volume flow rate of from about 0.05 to about 1.5 m$^3$ per sec per m$^2$. As a result of the heating procedure, the crystallized material fed along the wall of a hole are fused to produce a film which, after it has solidified, forms a solid girdle for the compacted crystalline material.

According to the invention, it is possible to dispense with the plasticity of the material, which is usually required for extrusion, and hence with the amount of material which has not solidified by the time it has reached the end of the screw. It is not necessary for the temperature and rotary speed of the extruder to be set exactly in order to achieve a particular crystallinity, since the crystallinity at the end of the extruder may even be 100%. Consequently, it is even possible to extrude powder and to convert the extrudates into granules which have a long shelf life and produce little dust.

The melt film, whose thickness may be up to 0.2 mm but is preferably less than 0.1 mm, produces a smooth surface when it solidifies after emerging from the passage, whereas, in the case of completely crystallized materials, a fine-particle structure is retained in the interior of the extrudate. This has the advantage that it permits particularly good solubility of the granules to be achieved. Furthermore, because of the melt film, a very great reduction in the pressure loss during flow through the narrow passage is achieved. Consequently, the required specific drive power of the extruder can be reduced in general from values greater than 0.05 kWh/kg to less than 0.01 kWh/kg, i.e. to less than 1/5 of the usual value. The economic advantages of the novel process are thus obvious.

The extrudates of the material are comminuted and cooled in the downstream zone. Preferably, the extrudates are comminuted to particles which have a length of from 2 to 20 times the diameter of the holes.

Organic materials compounded in this manner have improved flowability and a long shelf life. The process can be carried out in closed units so that it is also possible for materials which sublime or produce annoying odors to be compounded continuously. In particular, products which produce little dust and have a smooth surface formed by the melt film are obtained.

EXAMPLE

Molten $\beta$-naphthol (Mp=121° C.) is crystallized continuously, by cooling at 30° C., in a modified twin-screw type ZDS-K 53 heat exchanger extruder, and is extruded with the aid of a perforated plate having 10 holes, each of 3 mm diameter. The perforated plate is heated to 137° C.; the throughput is 150 kg/h and the specific drive power if 0.02 kWh/kg. The extrudates leave the perforated plate at about 114° C. and are fed, in a discharge chute, to an enclosed, continuously operating cooled vibrating-screw conveyor. During this procedure, the extrudates break up into 5–10 mm long granules. The granules are cooled to 60°–65° C. in a cooled screw conveyor and then introduced into appropriate 25 kg containers.

Tests to determine the shelf life were carried out in a chamber at 40° C. and a relative humidity of 95%. The containers were subjected to a load of 3750N. After storage for 6 months, it was possible to empty the containers satisfactorily. No agglomerates were found.

We claim:

1. A process for compounding an organic material which is crystalline under standard conditions, which process comprises:

introducing said material in a pulverulent and/or molten state into a self-purging, twin-screw extruder in which the screws rotate in the same direction, the temperature of the housing and of the screws is chosen so that the resulting mass temperature is about 1° to 20° C. below the melting point of the material, said material being crystallized when it reaches the end of the screw of the extruder;

ejecting the crystallized material from the extruder through a plate having 1 or more holes of from 1 to 15 mm in diameter, said plate being heated to a temperature above the melting point of the material, the specific volume flow rate of the material through the holes in the plate and the temperature of the plate being adjusted so that the surface of the ejected material is melted to form a film while the interior of the ejected material remains crystalline, the melted film having a thickness of up to 0.2 mm;

passing the ejected material to a cooled zone of lower pressure where the melt film is solidified, and thereafter comminuting the material.

2. A process according to claim 1, wherein the material is comminuted to give particles whose length is from 2 to 20 times the diameter of the holes.

3. A process claim 1, wherein the material is discharged through the holes at a specific volume flow rate of from about 0.05 to about 1.5 $m^3$ per sec per $m^2$.

* * * * *

UNITED STATES PATENT AND TRADEMARK OFFICE
CERTIFICATE OF CORRECTION

PATENT NO. : 4,769,200

DATED : September 6, 1988

INVENTOR(S) : Hupfer et al.

It is certified that error appears in the above-identified patent and that said Letters Patent is hereby corrected as shown below:

In the Abstract:, line 12,

... granules (havig) a smooth ...

should be:

... granules having a smooth ...

In the Claims:

Column 4, Line 43:

(A process claim 1 ):

should be:

A process according to claim 1 :

Signed and Sealed this

Fourth Day of April, 1989

Attest:

DONALD J. QUIGG

Attesting Officer

Commissioner of Patents and Trademarks